United States Patent [19]

Takahashi

[11] Patent Number: 5,373,444
[45] Date of Patent: Dec. 13, 1994

[54] APPARATUS AND METHOD FOR PROCESSING VEHICLE STEERING ANGLE SIGNAL

[75] Inventor: Akira Takahashi, Oota, Japan

[73] Assignee: Fuji Jukogyo Kabushiki Kaisha, Japan

[21] Appl. No.: 115,254

[22] Filed: Sep. 1, 1993

Related U.S. Application Data

[63] Continuation of Ser. No. 686,395, Apr. 17, 1991, abandoned.

[30] Foreign Application Priority Data

Apr. 24, 1990 [JP] Japan .................... 2-108274

[51] Int. Cl.$^5$ .................................. B62D 5/00
[52] U.S. Cl. ................... 364/424.05; 180/79.1; 180/142
[58] Field of Search ............ 364/424.05; 180/79.1, 180/140–143; 280/91; 74/388 PS

[56] References Cited

U.S. PATENT DOCUMENTS

| | | | |
|---|---|---|---|
| 4,720,791 | 1/1988 | Daido | 364/424.05 |
| 4,794,536 | 12/1988 | Eto et al. | 364/424.05 |
| 4,947,328 | 8/1990 | Sugasawa | 364/424.05 |
| 4,996,657 | 2/1991 | Shiraishi et al. | 364/424.05 |
| 5,001,637 | 3/1991 | Shiraishi et al. | 364/424.05 |
| 5,119,302 | 6/1992 | Abe et al. | 364/424.05 |
| 5,123,496 | 6/1992 | Kashihara et al. | 180/142 |

Primary Examiner—Gary Chin
Attorney, Agent, or Firm—Beveridge, DeGrandi, Weilacher & Young

[57] ABSTRACT

A steering angle of a motor vehicle is processed to obtain a correct value under any driving conditions. The vehicle speed signal from the vehicle speed sensor is compared with a preliminarily set value of the vehicle speed and it is decided whether or not an absolute value of the steering angle is higher than a preliminarily set value. The absolute angle signal is held for a predetermined time and the elapsed angle signal is converted into a digital signal. It is judged whether or not the digital signal is deviated from a reference value. A correction amount of the steering angle is calculated by incrementing with a resolving power so as to obtain a correct indication of the steering angle in any deviational conditions of the vehicle.

18 Claims, 5 Drawing Sheets

APPARATUS AND METHOD FOR PROCESSING VEHICLE STEERING ANGLE SIGNAL

This application is a continuation of application Ser. No. 07/686,395, filed Apr. 17, 1991, now abandoned, which application is entirely incorporated herein by reference.

BACKGROUND OF THE INVENTION

The present invention relates to apparatus and method for processing a steering angle signal generated from an absolute type steering angle sensor which detects a rotational angle of a steering system of a motor vehicle such as an automobile and generates the steering angle signal in response to the detected rotational angle.

In a four-wheel motor vehicle which is capable of controlling a rotational steering angle of rear wheels in response to a steering angle of front wheels, there is conventionally known as a steering angle detecting system for the front wheel, a so-called "absolute type" steering angle sensor. Such a steering angle sensor comprises a small gear coupled with a steering shaft and a potentiometer whose output voltage is changed in response to the revolution of a large gear meshed with the small gear. The sensor detects the rotational angle of the steering shaft in response to the output voltage of the potentiometer (the Japanese Utility Model Laid-Open (KOKAI) Publication No. 62-14309).

The applicant of the present application has filed Japanese Utility Model Application No. 1-26899 (26899/1989), which discloses a clutch mechanism disposed between the steering angle sensor and a gear shaft of a driven gear meshed with a driving gear mounted to the steering shaft to exactly adjust 0 point of a steering wheel angle to an actual central point of the steering angle sensor by a push button. In this case where the absolute type steering angle sensor is utilized as the rotational steering angle is optionally detected.

However, in the mechanism described above, a minute adjustment is required to exactly meet the 0° steering wheel angle point with the central point of the steering sensor. There also remains a problem of the deviation between the 0° steering wheel angle point and the central point of the steering sensor which may be caused by the wear of tires or a suspension bushing by long use, or by a sudden change of the bilateral balancing condition against the load exerted on the vehicle, or due to the tire exchanging operation, even if the 0° steering wheel angle point and the central point of the steering sensor be once exactly adjusted so as to meet with each other.

SUMMARY OF THE INVENTION

An object of the present invention is to substantially eliminate the defects or drawbacks encountered in the prior art and to provide apparatus and method for processing a steering angle of a motor vehicle. The apparatus and method are capable of obtaining a correct steering angle within a predetermined time in response to a steering signal transmitted from a steering angle sensor even in a case where a change due to wearing of a vehicle tire by long use, or an accidental change of the bilateral balancing of load to the vehicle occurs.

This and other objects according to the present invention is to provide an apparatus for processing a steering angle of a steering system mounted on a motor vehicle, having a front wheel steering mechanism connected to front wheels for steering the front wheels, a steering shaft connecting a steering wheel, the steering mechanism controlled depending on driving conditions of the vehicle, a vehicle speed sensor for detecting a vehicle speed and for producing a vehicle speed signal, and a steering angle sensor mounted on the steering shaft for detecting a steering angle of the front wheels and for generating a steering angle signal, the apparatus comprising:

a condition detector responsive to the vehicle speed signal and the steering angle signal for detecting an excusable condition of deciding a steering angle correction and for generating a time elapsed signal when an excusable condition is detected and when predetermined time has passed after a preceding generation of the time elapsed signal;

correction angle deciding means responsive to the time elapsed signal for judging whether or not the steering angle signal is deviated from a reference value and for producing a deviation signal; and correction angle calculating means responsive to the deviation signal for calculating a correction amount of the steering angle by incrementing with resolving power so as to obtain a correct indication of the steering angle in any deviation condition of the vehicle.

In another aspect, there is provided a method of processing a steering angle of a steering system for a motor vehicle, having a front wheel steering mechanism connected to front wheels for steering the front wheels, a steering shaft connecting a steering wheel, and the steering mechanism controlled depending on driving conditions of the vehicle, the method comprising:

detecting a vehicle speed;

sensing a steering angle;

deciding an excusable condition of steering angle correction by comparing the vehicle speed signal with a preliminarily set value of vehicle speed by comparing the steering angle signal with preliminarily set value of steering angle and by counting a time from a preceding correction of steering angle;

and detecting an excusable condition of steering angle correction;

judging whether or not a preceding corrected steering angle signal is deviated from reference value;

calculating a correction amount of the steering angle by incrementing with a resolving power;

correcting a steering angle signal by calculating correction amount; and

Producing a corrected steering angle signal so as to obtain a correct indication of the steering angle in any deviation condition of the vehicle.

According to the characters of the steering angle processing apparatus and method according to the present invention, the movement of the steering mechanism of the steering wheel of a four-wheel vehicle is detected. The absolute type of steering angle sensor generates the steering angle signal corresponding to the steering wheel angle or front wheel steering angle so that the deviation between the output signal value from the absolute type steering angle sensor and the actual steering angle is made below the predetermined value. At a time when it is required to correct the output signal value from the steering angle sensor, the steering angle correction amount is gradually increased and decreased depending on the bilateral steering condition of the corrected steering angle signal value every setting time in a case where the corrected steering angle signal value is within the preliminarily set steering angle at a time of running of the vehicle with a speed more than the set speed. The corrected steering angle signal is produced by subtracting the corrected steering angle amount from the output signal value of the steering angle sensor.

According to the present invention as described above, it is made possible to obtain the correct steering angle within the predetermined time even if adjusting means for adjusting the central point of the absolute type steering angle sensor to the 0° steering wheel angle point depending on the straight running condition of the motor vehicle. Furthermore, the corrected steering angle can be obtained within the predetermined time in a case where the change due to wearing of the tire or suspension bushing of the vehicle by long use, or the accidental change due to the bilateral balancing condition of the vehicle load occurs.

DESCRIPTION OF THE PREFERRED EMBODIMENT

A preferred embodiment of the present invention will become understood from the following detailed description with reference to the accompanying drawings.

Figure 1:
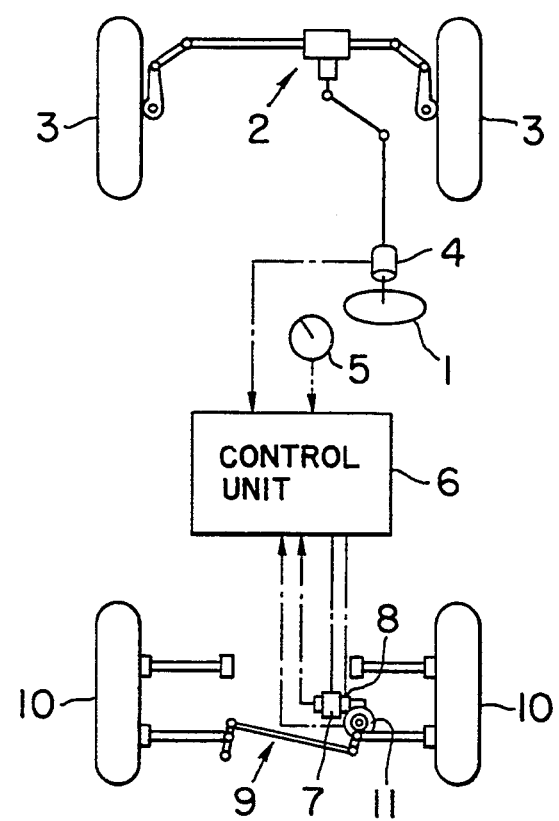
FIG. 1 is a schematic chart of a steering system of a four-wheel vehicle of the present invention.

Referring to FIG. 1, showing a schematic chart of a steering system of a four-wheel motor vehicle to which the present invention is applied, the vehicle is provided with front and rear wheels 3 and 10. A front wheel steering mechanism 2 of rack-and-pinion type is disposed between the front wheel 3 and a steering wheel 1. The front wheel steering mechanism 2 is provided with an absolute type steering angle sensor 4 for detecting a steering angle of the front wheel from a rotational angle of a steering shaft 15 (see FIG. 2) and an amount of displacement of a rack shaft of a rack-and-pinion mechanism. A front wheel steering angle signal and a vehicle speed signal from a vehicle speed sensor 5 are inputted into a control unit 6 by every set time.

The front and rear wheel steering angle ratio characteristics corresponding to the vehicle speed are preliminarily set in the control unit 6. When the front wheel steering angle signal and the vehicle speed signal are inputted into the control unit 6, an objective value of the rear wheel steering angle is determined depending on the preliminarily set characteristics and then an output signal is generated in response to the thus determined objective value of the rear wheel steering angle.

An electromagnetic clutch 8 for an electric motor 7 is operatively connected to the control unit 6. The electromagnetic clutch 8 is switched "ON" in response to the output signal from the control unit 6 and the motor 7 is driven. The rotation of the motor 7 is transmitted to the rear wheels 10 to steer the rear wheel 10 through a rear wheel steering mechanism 9 comprising a speed reduction mechanism including a worm gear, a worm wheel and a link mechanism. At this operation, the rear wheels 10 are steered depending on the objective value of the rear wheel steering angle determined by the control unit 6 in accordance with the feedback control due to the rear wheel steering angle from a rear wheel steering angle sensor 11 which detects the rear wheel steering angle.

Figure 2:
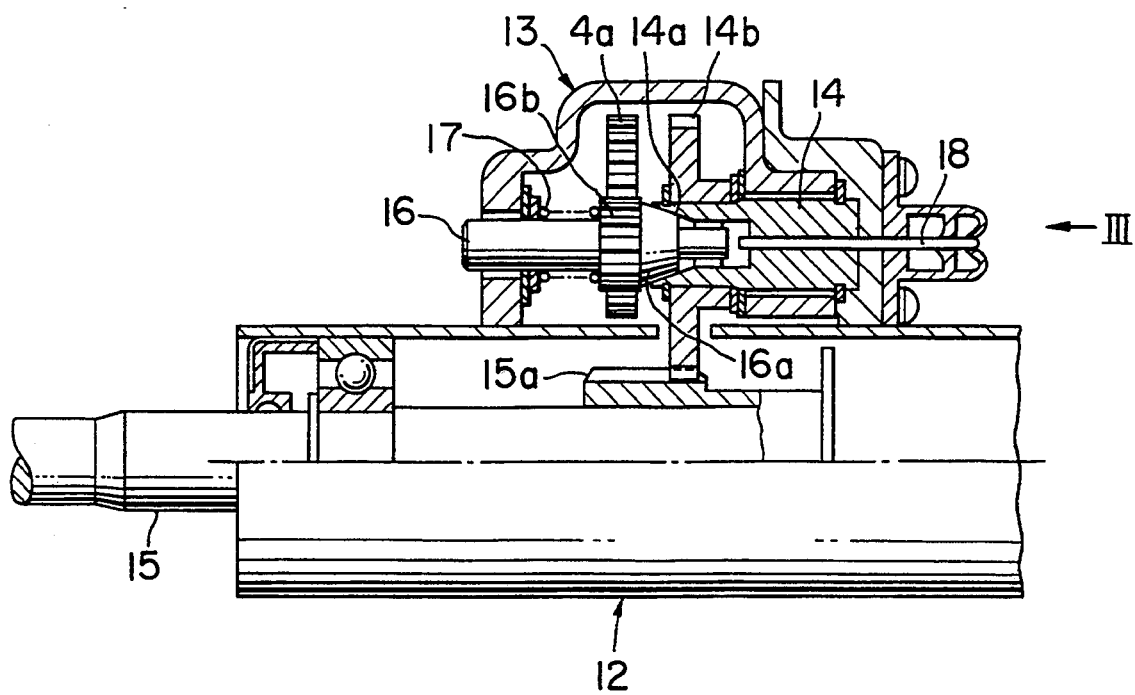
FIG. 2 is a sectional side view of an absolute type steering angle sensor.
Figure 3:
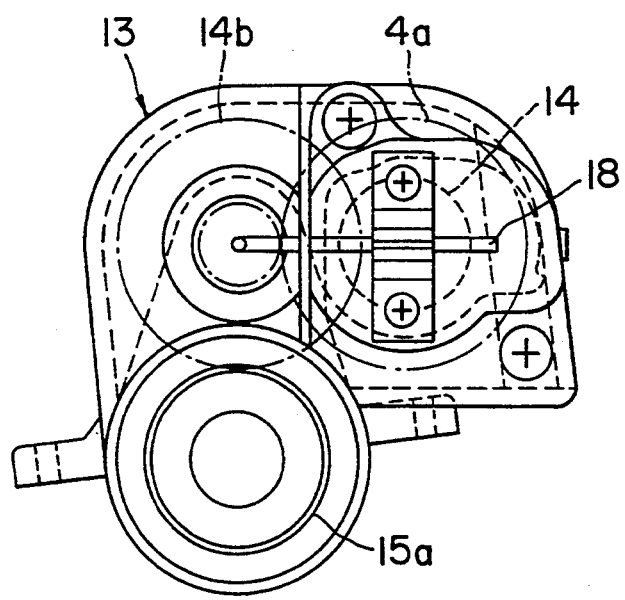
FIG. 3 is an end view seen from an arrowed direction III of FIG. 2.
Figure 4:
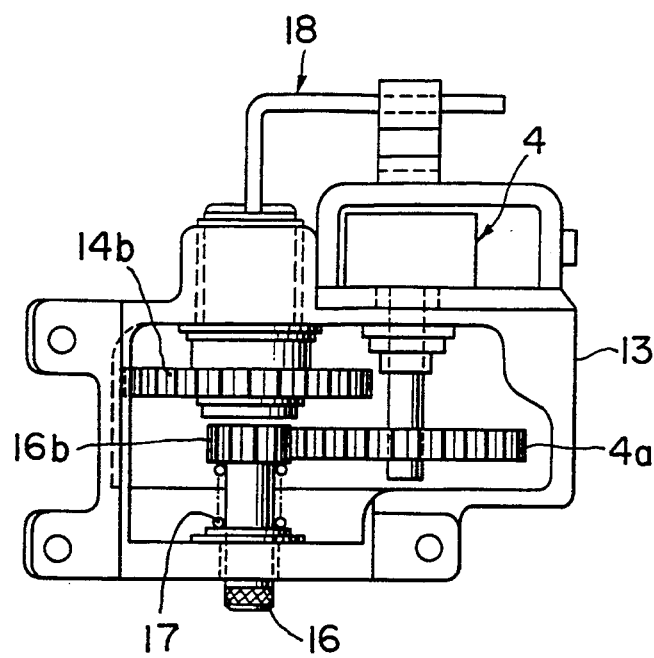
FIG. 4 is a bottom view of FIG. 3.

FIGS. 2 to 4 show the structure of the absolute type steering angle sensor mounted to a column 12. Referring to FIGS. 2 to 4, a steering angle sensor case 13 is secured to the column 12 by means of bolts, not shown, and a first driving shaft 14 is rotatably supported to the steering angle sensor case 13. The driving shaft 14 is provided with an outwardly tapered front conical portion 14a and a second gear 14b which is mounted to the outer periphery of the driving shaft 14 and composed of the first speed reduction mechanism in engagement with a first gear 15a mounted to the steering shaft 15.

A driven shaft 16 is also rotatably and slidably supported to the steering angle sensor case 13. The driven shaft 16 is provided with a front wedge portion 16a having a shape suitable for transmitting a rotating force by the abutment thereof against the tapered front conical portion 14a of the first driving shaft 14. The driven shaft 16 is also provided with a third gear 16b which is mounted to the outer periphery of the driven shaft 16 and which is composed of the second speed reduction mechanism in engagement with a fourth gear 4a mounted to the rotation shaft of the absolute type steering angle sensor 4 secured to the steering angle sensor case 13. A spring 17 is disposed between the driven shaft 16 and the steering angle sensor case 13 so as to urge the wedge portion 16a of the driven shaft 16 against the tapered conical portion 14a of the driving shaft 14. An adjust pin 18 is arranged so as to release the engagement between the wedge portion 16a and the conical portion 14a against the urging force of the spring 17. The point of 0° steering wheel angle of the steering shaft 15 and the neutral point of the absolute type steering angle sensor 4 can be exactly met with each other by releasing the engagement between the driving and driven shafts 14 and 16 by operating the adjust pin 18.

Figure 5:
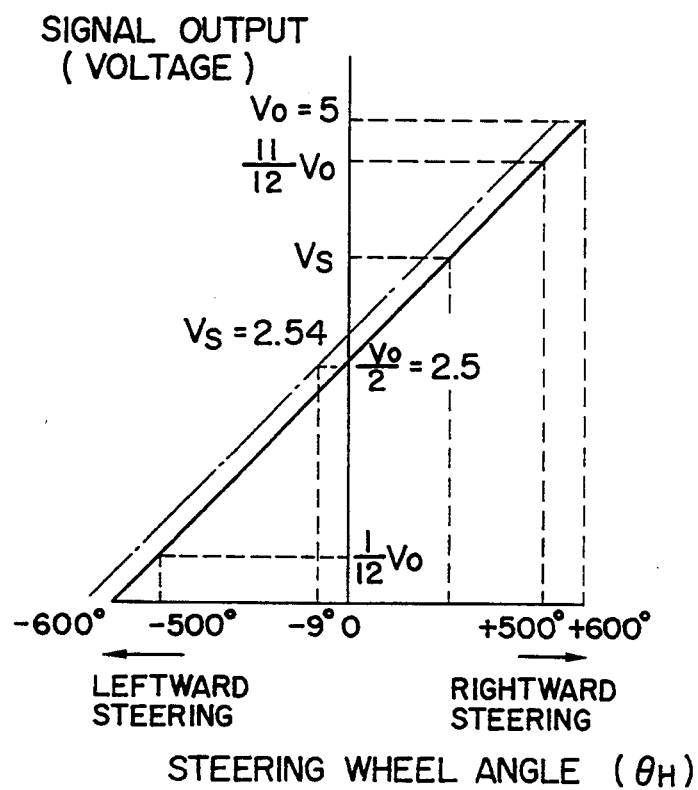
FIG. 5 is a graph representing output voltage characteristics of a potentiometer in the absolute steering angle sensor.

With the system described above having the clutch mechanism in the transmission unit of the vehicle for transmitting the rotation of the steering shaft 15 to absolute type steering sensor 4 through a plurality of speed reduction mechanisms, the positioning of the absolute type steering angle sensor 4 is generally performed by utilizing the steering wheel 1 and the potentiometer. This process is performed to confirm the fact, by the observation of a volt meter, that a signal output having a voltage (2.5 volts, for example), corresponding to half of an power source voltage (5 volts, for example) applied to the potentiometer as shown by a solid line in FIG. 5 when the vehicle runs straight (i.e. the steering wheel angle $\theta_H$ of 0° angle), is generated from the potentiometer. However, the solid line of FIG. 5 represents an ideal condition and even if the absolute type steering angle sensor is first exactly positioned, the position thereof may be deviated by a change of tire wear or the suspension bushing by long use, or an accidental change of the bilateral balancing condition of the load.

The present invention was conceived to solve such problems as described above and to provide an apparatus and method for processing the steering angle signal to obtain the corrected steering angle within a predetermined time interval in a case of the abrasion change with elapse of time or the accidental condition change of the steering system. The processing method will be described hereunder.

In consideration of the occurrence of the problems described above, supposing that the absolute type steering angle sensor can detect a steering angle range (±600°) over a steering angle range (for example, ±500°) of the steering wheel, a signal output in a case of most leftward steering time ($\theta_H = -500°$) is expressed as $V_s = 1/12 \, V_o = 1/12 \times 5 = 0.417$ V, whereas the signal output in case of most righthand steering time ($\theta_H = +500°$) is expressed as $V_s = 11/12 \, V_o = 11/12 \times 5 = 4.583$ V. When the vehicle runs straight ($\theta_H = 0°$), the signal output is expressed as $V_s = 2.5$ V.

The ranges 0 to 5 V of these signal outputs are effected with A/D conversion of 10 bit in a microcomputer incorporated in the control unit 6 and, after the A/D conversion, the converted values are divided by $2^{10}$ to obtain the digital values. In this manner, the values 055H, 3AAH and 200H are shown respectively at times of the most leftward (counterclockwisely) steering time, most rightward (clockwisely) steering time and the linearly running time.

The resolving power in this time becomes $1200°/2^{10} = 1.17°$ of the steering wheel steering angle, which is the minimum unit for the calculation which is to be carried out thereafter.

Now, supposing a case wherein the steering wheel steering angle $\theta_H$ of the absolute steering angle sensor is deviated by about 9° as shown by one dot and chain line in FIG. 5, the sensor 4 generates a signal output Vs as if the steering wheel angle $\theta_H$ is about 9° in spite of the fact that the vehicle straightly runs linearly with the steering wheel angle of 0°, that is, $V_s = 609/1200 \times 5 = 2.54$ V and A/D converted value of 208H.

Figure 7:
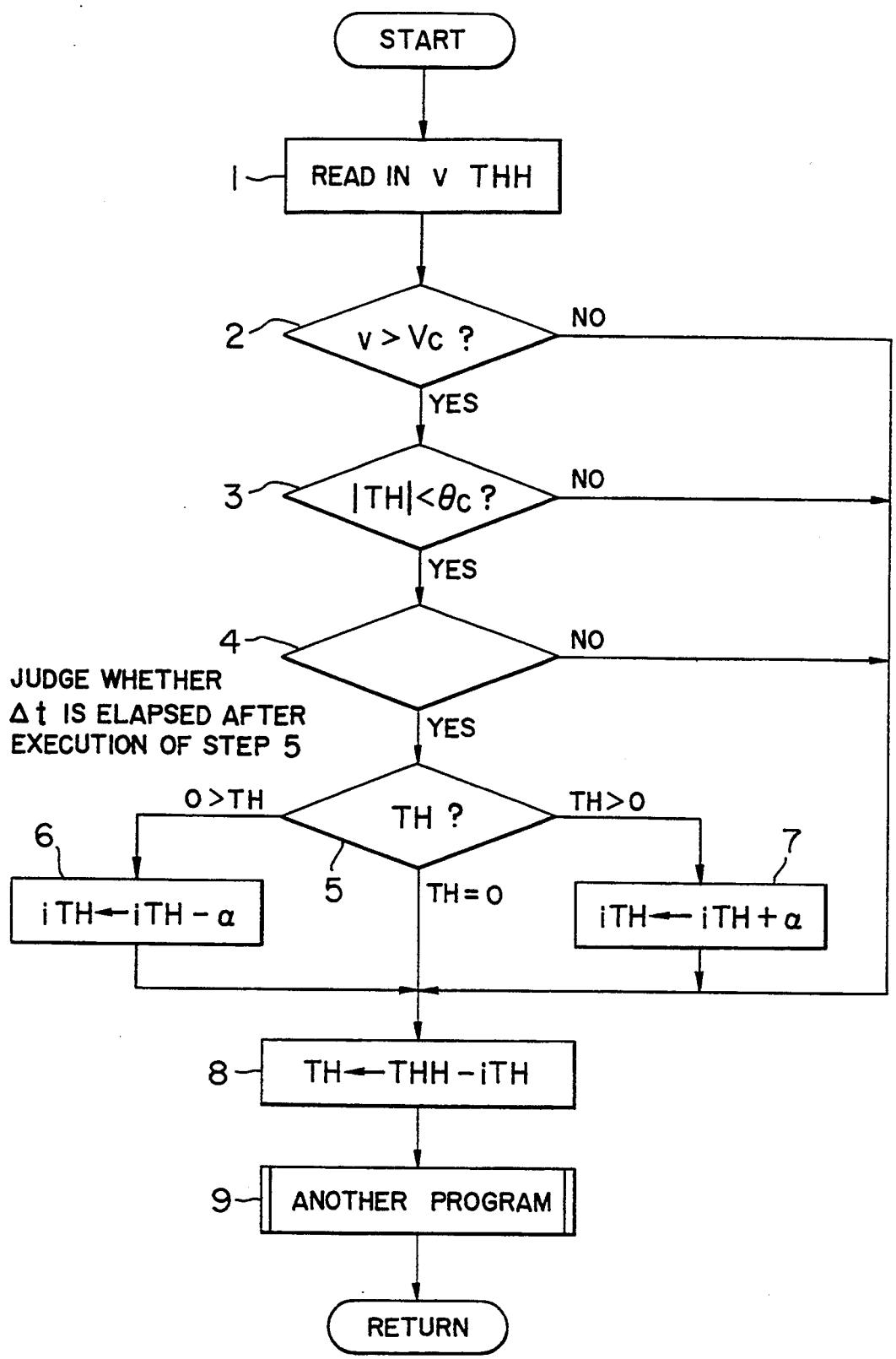
FIG. 7 is a flow-chart representing the steering angle signal processing steps.

As mentioned above, in a case where an error is caused between the point of the steering wheel angle of 0° and the neutral point of the absolute type steering sensor, the steering angle signal is corrected by the microcomputer incorporated in the control unit 6 in response to the steering signal generated from the steering angle sensor 4 in accordance with the steps shown by the flow-chart of FIG. 7 according to the present invention.

Referring to FIG. 7, the steering angle signal THH (about 9°, A/D converted value: 208H) from the absolute type steering angle sensor 4 and the vehicle speed signal v are read out (Step 1).

In the next Step 2, it is determined as to whether or not the vehicle speed signal v is more than the preliminarily set vehicle speed Vc (Vc=10 km/h, for example). The step 2 is carried out for the reason to avoid erroneous when the vehicle is parked with the steering wheel being rotated. When the vehicle speed signal v is below the set value Vc, it is determined that no correction should be made and the operation will be jumped to the Step 8.

In the Step 3, it is determined whether or not the corrected steering angle signal TH just before this step is smaller than a preliminarily set steering angle $\theta_c$ ($\theta_c = 30°$, for example) It is desired that the set steering angle $\theta_c$ is set at a minimum value which can absorb the signal deviation caused by various factors such as described above.

In the next Step 4, a sampling time $\Delta t$ ($\Delta t = 4$ sec., for example) of a correction timing of the steering angle signal is determined with such an interval as that the apparent variation of the steering angle due to the correction is not recognized by a driver of the vehicle.

In the next Step 5, it is determined whether the corrected steering angle signal TH just before this step is generated depending on the rightward rotation of the steering wheel (TH>0), the leftward rotation thereof (TH<0), or no rotation thereof (TH=0). Therefore, the amount of correction of the steering angle iTH ($\alpha = 001H = 1.17°$) is corrected in the next Steps 6 and 7.

When an ignition switch is on, the correction amount iTH of the steering angle is zero. Then the operation is jumped from the Step 2 to the Step 8 based on the judgement in the Step 2 till the vehicle speed v becomes the set speed Vc. Namely, since the Steps 6 and 7 are not executed, the correction amount iTH is not changed and the condition of iTH=0 (zero) is maintained, and in the Step 8, the steering angle TH is of TH=THH−iTH=208H−000H=208H (about 9°).

When the vehicle speed v increases or exceeds the set value Vc, the corrected steering angle signal TH is discriminated to be TH>0 in the Step 5 and goes to the Step 7 with the correction amount iTH of the steering angle being iTH+$\alpha$ because, in the foregoing program execution process, in the Step 8 of the foregoing program execution process, the corrected steering angle signal TH was about 9° (A/D converted value: 208H).

In this equation, it is desirable that the value $\alpha$ should be made small so that the behavior of the vehicle is not changed in accordance with the change of the value $\alpha$, and in this operation mode, the value $\alpha$ is made to the resolving power (1 bit=1.17°) of the absolute type steering angle sensor 4.

Accordingly, the correction amount iTH is expressed as iTH=1.17° (1 bit), and in the Step 8, the corrected steering angle signal TH just before this step is corrected as TH=THH−iTH=208H−001H=207H (about 8°).

Figure 6:
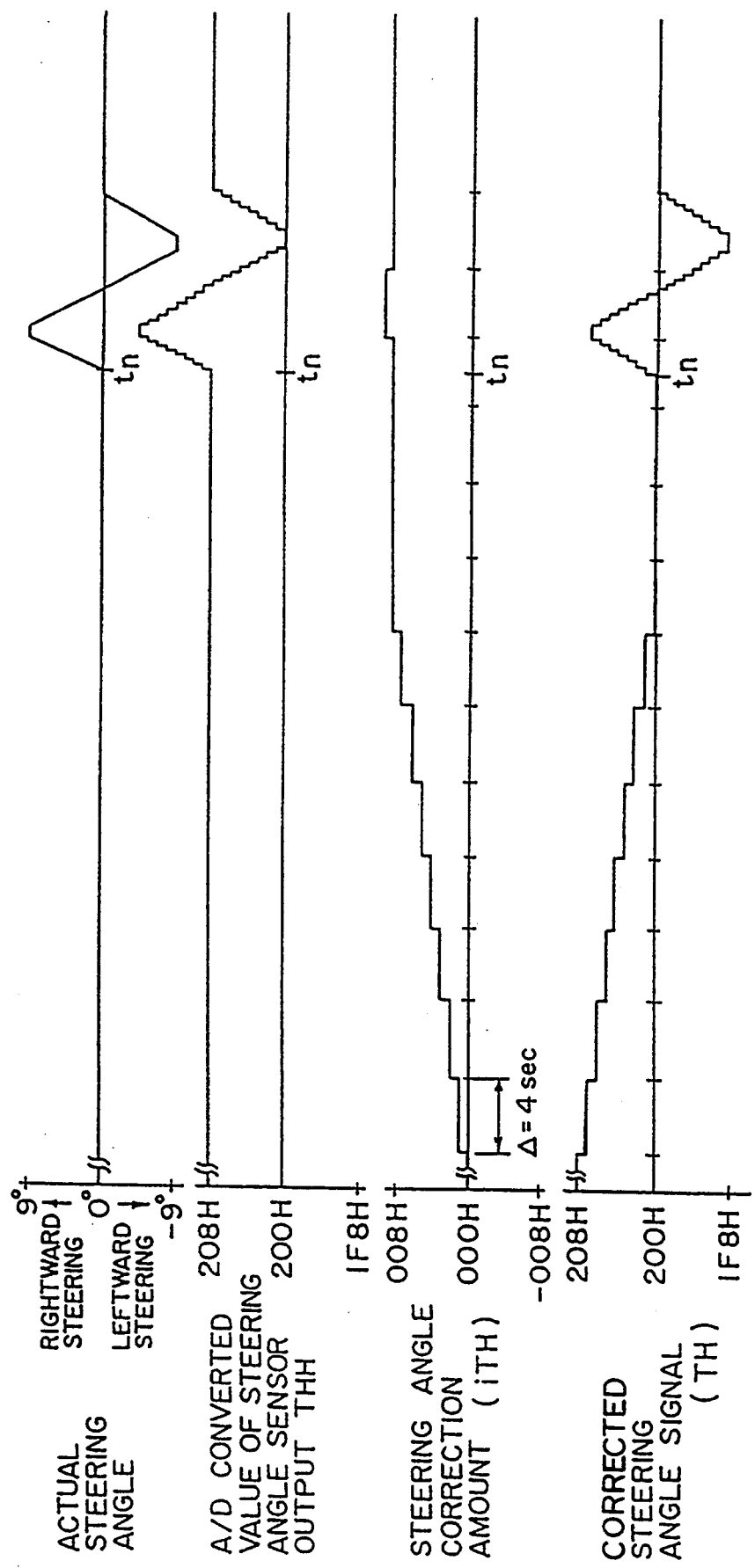
FIG. 6 shows a time-chart representing a steering angle digital value THH, a steering angle correction amount iTH and a corrected steering angle signal TH.

These operations or steps are repeated every sampling time $\Delta t$ (4 sec.) shown in the Step 4 and the corrected steering angle signal TH, i.e. TH=0, as shown in FIG. 6 is obtained within about 30 sec.

The calculation or operation described above represents a case where the absolute type steering angle sensor generates a steering angle signal having a constant value.

Accordingly, only the subtraction correction by the constant correction amount is continuously carried out, so that, as shown in the lefthand half of FIG. 6, the corrected steering angle signal TH decreases stepwisely and finally becomes 0° as the actual steering angle. In a case, thereafter, where the steering wheel is rotated from the original position first rightwardly and then leftwardly to the original position for changing the traffic lane of the vehicle, for example, the corrected steering angle TH substantially represents the actual steering angle as shown in, the righthand half of FIG. 6.

Namely, when the steering operation starts at a time of $t = t_n$ and ends after about 10 sec., the steering angle correction amount iTH is renewed by about two times during this steering operation and there causes a difference corresponding to this renewal operation between the corrected steering angle signal TH and the actual steering angle. However, this difference is very minute, which is negligible in the actual steering operation of the rear wheels.

In the described embodiment, an example in which the sampling time Δt of the correction operation is 4 sec. is described, but other optional value may be taken as far as the variation of the steering angle due to the correction is not recognized by the driver.

Furthermore, in the embodiments described above, there is described an example in which an error between the output signal value and the actual steering angle is set so as to become lower than the set value by utilizing the clutch mechanism but it may be possible to precisely adjust the attaching position of the steering angle sensor to the sensor casing.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An apparatus for processing a steering angle signal detected by a steering angle sensor of a motor vehicle, and for producing a corrected steering angle signal so as to correspond to an actual steering condition of said vehicle, the motor vehicle having a vehicle speed sensor for detecting a vehicle speed and for producing a vehicle speed signal, said apparatus comprising:

condition detecting means responsive to said vehicle speed signal and said corrected steering angle signal for detecting an excusable condition of deciding a steering angle correction and for generating a signal when said excusable condition is detected;

correction deciding means responsive to said signal from said condition detecting means for judging whether or not a preceding value of said corrected steering angle signal is deviated from a reference value and for producing a deviation signal when it is judged that said preceding value of said corrected steering angle signal is deviated from said reference value;

correction angle changing means responsive to the deviation signal for changing a correction amount to be applied to said detected steering angle signal, by a predetermined value; and corrected steering angle calculating means for calculating present value of said corrected steering angle signal by correcting said detected steering angle signal by said correction amount.

2. The apparatus according to claim 1, wherein said condition detecting means comprises:

a vehicle speed comparator responsive to the vehicle speed signal for deciding whether or not the vehicle speed signal is higher than a preliminarily set value of vehicle speed.

3. The apparatus according to claim 1, wherein said condition detecting means comprises;

a steering angle comparator responsive to the corrected steering angle signal for deciding whether or not an absolute value of the corrected steering angle signal is higher than a preliminarily set value of steering angle.

4. The apparatus according to claim 1, wherein said reference value is a neutral steering angle of the vehicle.

5. A method of processing a steering angle signal detected by a steering sensor of a motor vehicle and for producing a corrected steering angle signal so as to correspond to an actual steering condition of said vehicle, said method comprising the steps of:

detecting a vehicle speed signal;

deciding an excusable condition of steering angle correction by comparing the vehicle speed signal with a preliminarily set value of vehicle speed and by comparing the detected steering angle signal with a preliminarily set value of steering angle;

judging whether or not a preceding value of said corrected steering angle signal is deviated from a reference value when said excusable condition is decided;

changing a correction amount to be applied to said corrected steering angle signal, by a predetermined value when said preceding value of said corrected steering angle signal deviates from said reference value; and correcting said detected steering angle signal by said correction amount to obtain a present value of said corrected steering angle signal to be produced.

6. The method according to claim 5, further comprising the step of:

judging whether a sampling time is elapsed in order to repeat the steering angle correction every sampling time when said excusable condition of the steering angle correction is decided.

7. An apparatus for processing a steering angle detected by a steering angle sensor for a motor vehicle, and for producing a corrected steering angle signal so as to correspond to an actual steering condition of said vehicle, said motor vehicle having vehicle driving condition detecting means for detecting vehicle driving conditions, comprising:

judging means responsive to said vehicle driving conditions for judging whether a steering angle correction is excusable;

correction determining means for determining whether a preceding value of said corrected steering angle signal is deviated from a neutral steering angle when said judging means judges that the steering angle correction is excusable;

correction amount changing means for changing a correction amount to be applied to said detected steering angle signal when said correction determining means determining that said preceding value of said corrected steering angle signal is deviated from said neutral steering angle; and corrected angle calculating means for calculating a present value of said corrected steering angle signal by correcting said detected steering angle with said correction amount;

said correction amount changing means for varying said correction amount so as to reduce a deviation of said preceding value of said corrected steering angle signal from said neutral steering angle.

8. The apparatus according to claim 7, wherein said vehicle driving condition detecting means includes a vehicle speed sensor provided to detect a vehicle speed and said judging means includes a vehicle speed comparing means for comparing said vehicle speed with a preset value of the vehicle speed and for judging that the steering angle correction is excusable when said vehicle speed is higher than said preset value.

9. The apparatus according to claim 7, wherein said judging means includes a steering angle comparing means for comparing said preceding value of said corrected steering angle signal with a present value of the steering angle and for judging that the steering angle correction is excusable when said preceding value is smaller than said present value.

10. The apparatus according to claim 7, wherein said judging means is adapted to count a sampling time in order to repeat the steering angle correction every sampling time when said judging means decides that the steering angle correction is excusable.

11. The apparatus according to claim 7, wherein said correction amount changing means is adapted to set a present value of the correction amount by correcting a preceding value of the correction amount by a predetermined value.

12. The apparatus according to claim 7, further comprising a rear wheel steering mechanism provided to steer rear wheels and control means responsive to said corrected steering angle signal for controlling a steering angle of the rear wheels through said rear wheel steering mechanism.

13. A system for producing a corrected steering angle corresponding to an actual steering condition in a vehicle having a steering angle sensor, said system comprising:
vehicle speed sensor for producing a vehicle speed signal;
correction condition determining means for generating a correction indication signal, based on said vehicle speed signal and a present corrected steering angle signal value, said correction condition signal indicating whether a steering angle correction condition exists;
correction decision means, responsive to said correction condition signal, for initiating a steering angle correction when a difference between a reference value and said present corrected steering angle signal value is sufficient to warrant a correction;
correction adjusting means for generating a steering angle correction adjustment value in response to an indication from said correction decision means; and
steering angle correction means for calculating said corrected steering angle based upon a steering angle sensed by said steering angle sensor and said steering angle correction adjustment value.

14. The system claimed in claim 13, wherein said correction condition determining means further determines whether a periodic time period has expired.

15. The system claimed in claim 13, wherein said steering angle adjustment value is a predetermined incremental value.

16. A system for producing a corrected steering angle value by correcting a steering angle value sensed by a steering angle sensor in a vehicle, said system comprising:
vehicle speed sensing means for producing a vehicle speed signal;
correction condition determining means for indicating whether a correction condition exists based on said vehicle speed signal and a most recent corrected steering angle value;
correction decision means which, in response to an indication by said correction condition determining means, initiates a steering angle correction when a difference between a reference value and said most recent corrected steering angle value is sufficient to warrant a correction;
correction value adjusting means for generating a steering angle adjustment value in response to an indication by said correction decision means; and
steering angle correction means for calculating said corrected steering angle value by correcting said sensed steering angle value using said steering angle adjustment value.

17. The system claimed in claim 16, wherein said correction condition determining means further determines whether a periodic time period has expired.

18. The system claimed in claim 16, wherein said steering angle adjustment value is a predetermined incremental value.

* * * * *